United States Patent
Dultz et al.

(10) Patent No.: US 6,609,139 B1
(45) Date of Patent: Aug. 19, 2003

(54) METHOD FOR GENERATING A RANDOM NUMBER ON A QUANTUM-MECHANICAL BASIS AND RANDOM NUMBER GENERATOR

(75) Inventors: Wolfgang Dultz, Frankfurt am Main (DE); Gisela Dultz, Frankfurt am Main (DE); Eric Hildebrandt, Frankfurt am Main (DE); Heidrun Schmitzer, Regensburg (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/485,835

(22) PCT Filed: May 28, 1999

(86) PCT No.: PCT/EP99/03689

§ 371 (c)(1),
(2), (4) Date: May 9, 2000

(87) PCT Pub. No.: WO99/66641

PCT Pub. Date: Dec. 23, 1999

(30) Foreign Application Priority Data

Jun. 16, 1998 (DE) .......................................... 198 26 802

(51) Int. Cl.[7] ................................................. G06F 1/02
(52) U.S. Cl. ...................................... 708/250; 708/255
(58) Field of Search ................................. 708/250–256

(56) References Cited

U.S. PATENT DOCUMENTS 5,953,421 A * 9/1999 Townsend .................... 380/283
6,393,448 B1 * 5/2002 Dultz et al. .................. 708/250

FOREIGN PATENT DOCUMENTS

DE 196 41 754 4/1998
DE 198 06 178 8/1999

OTHER PUBLICATIONS

Rarity et al., "Quantum Random–Number Generation and Key Sharing," Journal of Modern Optics, vol. 41, No. 12, Dec. 1, 1994, pp. 2435–2444.*

* cited by examiner

Primary Examiner—Tan V. Mai
(74) Attorney, Agent, or Firm—Kenyon & Kenyon

(57) ABSTRACT

A method and an apparatus for generating a random number on a quantum-mechanics machanics basis using the fundamentally random choice of path of a quantum particle on a beam splitter. Detectors are provided for capturing the particles being assigned to the outputs of the beam splitter. The detectors or their counting events represent different number values of the random number, or random number sequence. The generation of a multi-particle state in the output channel of the beam splitter, and thus of several particles which impact on a detector ($D_1$, $D_1'$, $D_2$, $D_2'$), significantly and advantageously increases the response probability of the detector and thus the probability of obtaining a useable counting event for every multi-particle state generated by the particle source. In this way a random sequence can be obtained more rapidly and more reliably than with single-particle detection.

25 Claims, 3 Drawing Sheets

TYPE I

TYPE II

METHOD FOR GENERATING A RANDOM NUMBER ON A QUANTUM-MECHANICAL BASIS AND RANDOM NUMBER GENERATOR

FIELD OF THE INVENTION

The present invention relates to a method and apparatus for generating a random number on a quantum-mechanical mechanical basis using a beam splitter.

RELATED TECHNOLOGY

Binary random numbers are the backbone of many encryption techniques for the secret and secure exchange of messages. Especially well known is the sole secure cryptography method in which the key is composed of a random sequence of binary zeros and ones which is as long as the binary message itself and which is only used once ("one time pad" method). It may be that a spy who, for example, tries out all the possible keys will at some stage or other also use the correct key and decrypt the message with it. However, with the same probability, he will also obtain all manner of other possible messages of the same length, and he will not be able to discover the correct one, apart from the fact that, in the case of longer messages, the number of possible keys is astronomical and exceeds the capacity of any computer.

Random numbers are also needed for scientific and technical purposes (Monte Carlo method), but especially for games of chance. For lottery games and gambling machines, the quality of these numbers is the basis for the confidence of the players in the equipment and, therefore, is prerequisite for its economic operation. Consequently, cryptography and games of chance are dependent to a very considerable extent on the quality of random series of numbers.

Moreover, the trustworthy generation of random numbers is one of the primary tasks of a company involved in the transmission of messages.

Till now, basically two different classes of methods have been used for generating random numbers:

In algorithmic methods, a short starting sequence (seed) is used to generate a considerably longer pseudo-random sequence with the aid of mathematical operations which can be executed in software or in hardware. These pseudo-random numbers have been produced by deterministic processes in the computer, and are therefore basically not random. For many applications, however, such as for use in simulations according to the Monte Carlo method, they are sufficient and even have advantages, because they can be repeatedly generated in the same sequence. However, random-number generators designed on the basis of algorithmic methods frequently fail to satisfy the requirements of cryptography because, in the generation of the random number, there are a certain number of unusable sequences (weak keys) from the beginning, and it can be expected that there will be correlations between the random numbers.

The second class of methods for generating random numbers are physical methods. In these methods, use is made of the statistical character of certain physical processes. Generally, physical methods can be further subdivided into:

statistical processes which, although they obey deterministic equations of motion, are not predictable because of the high complexity and lack of knowledge of the initial state. Random-number generators on this basis are, for instance, the tossing of a coin "heads" or "tails", or lottery machines. Such methods produce a deterministic chaos which can be considered random because, when each individual random number is generated, the starting conditions of the generator are always slightly different, without such difference being quantifiable;

fundamentally random processes (elementary processes) of the kind described by quantum mechanics. According to the present status of science, such processes cannot be attributed to hypothetical deterministic mechanisms (hidden variables), and are therefore fundamentally random by nature.

Bit sequences generated by physical processes, especially by fundamentally random quantum processes, come closer to the concept of a random sequence than algorithmically generated sequences.

The decay of radioactive atoms is a random elementary event which, owing to the high energy of the particles produced, can be easily detected and has been proposed for the generation of a random number (M. Gude: Ein quasi-idealer Gleichverteilungsgenerator basierend auf physikalischen Zufallsphänomenen [A quasi-ideal uniform-distribution generator based on random physical phenomena], dissertation RWTH Aachen, 1987). A disadvantage in this connection, however, is the potentially harmful effect of radioactive radiation on humans and on sensitive electronic equipment.

Other physical random-number generators use physical noise sources, such as the electromagnetic noise of a resistor or diode, in order to generate random bit sequences (e.g. M. Richter: Ein Rauschgenerator zur Gewinnung von quasiidealen Zufallszahlenfür die stochastische Simulation [A noise generator for obtaining quasi-ideal random numbers for stochastic simulation], dissertation RWTH Aachen, 1992). With these methods, however, it is often difficult for the decision threshold between bit value 1 and bit value 0 to be set precisely and invariably with respect to time. Furthermore, such random-number generators can be manipulated from outside, in that an arbitrarily selected "noise", such as that from the irradiation of electromagnetic waves, can be superimposed on the quantum noise. Since it is not easy to separate the quantum noise from this extraneous pseudo-noise, such methods are considered unsafe.

An elementary random process which has undergone careful quantum-mechanical investigation is the path selection of an individual quantum of light (photon) at a beam splitter. It is fundamentally random into which of the output channels a photon will be transferred after it strikes the beam splitter. In order to generate a random sequence, the quantum of light is reflected or transmitted, for example, at a semi-transmitting mirror, the output channels of the beam splitter each being assigned a detector which registers the quantum and whose indicator represents—depending on the detector—the bit value 0 or 1 of the random sequence. Methods for generating random numbers on an optical basis and for the tap-proof transmission of the random code have been described, for example, in J. G. Rarity et al.: Quantum random-number generation and key-sharing, J. Mod. Opt. 41, p. 2435 (1994).

Problematic with the methods for generating a random sequence based on the individual-photon statistics at an optical beam splitter, however, are interference pulses of the detectors stemming, for instance, from cosmic radiation or other extraneous electromagnetic effects, and the low response probability of a detector to individual photons.

To date, there has been no light source which generates individual photons at identical time intervals. Previous light sources generate the photons in a random time sequence, so that it is impossible to foresee when a photon will strike the beam splitter of the optical random-number generator. This, combined with the detector noise, leads to interference pulses which are incorporated into the formation of the random sequence. In order to reduce the interference German Patent Document No. extraneous effects, it is described from DE 196 41 754.6 to employ a two-photon source as the light source in which the two photons of a photon pair are always generated approximately simultaneously. The two photons are spatially separated, one of the photons striking a trigger detector, and the other photon striking the beam splitter of the optical random-number generator. Only if the trigger responds, is the response of the detectors of the random-number generator registered. Consequently, the background due to the dark current of the detectors is reduced and the probability is increased that only those events attributable to the random-number-generating mechanism at the beam splitter will be included in the random sequence.

Basically, however, there is still the problem of the inadequate efficiency of detection of individual photons. One disadvantage of known optical random-number generators is the relatively low quantum efficiency of the detectors which are used to count the individual photons at the outputs of the beam splitter. In the best case, the quantum efficiency $\gamma$ for silicon detectors is $\gamma=0.7$ at approx. 700 nm, but this falls sharply in the infrared region of interest. Detectors for the second and third optical windows of telecommunications often have a quantum efficiency of only between 0.1 and 0.2, i.e., only one in five to one in ten photons striking the detector causes the detector to respond and leads to the generation of an output signal, and therefore of a bit value of the random sequence. In the case of a trigger detector coupled to the random-number generator according to German Patent Document No. DE 196 41 754.6, the response probability of the detector has particularly serious consequences with regard to the counting rate or speed with which a random sequence can be generated. For, since the quantum efficiency for two separate detectors which must respond simultaneously is proportional to $\gamma^2$, the counting rate is considerably lower compared to the case without a trigger.

It is proposed in German Patent Document No. DE 198 06 178.1 that, in order to increase the probability of detection, higher photon rates be used instead of one single photon, e.g., that showers of photons of n photons produced by a laser diode be employed. Problematic in this regard is the fact that all the photons of the shower of photons which strike the beam splitter must arrive in a common detector which will then, however, respond with a high probability. The probability that all the photons will arrive in a common detector is ½ for two photons, so that already in the case of a shower of just two photons, in half of the cases there will be no usable counting event (bit value 0 or 1 of the random sequence).

SUMMARY OF THE INVENTION

An object of the present invention, therefore, is to provide a method for generating a random number on a quantum-mechanical basis, as well as a random-number generator, in which the response probability of the detectors is increased and in which as many as possible of the particles emitted by the particle source result in a usable counting event at one of the detectors, i.e., the counting probability is increased, thus permitting the fast and reliable building of a random sequence.

The present invention provides a method and an apparatus for generating a random number using a beam splitter, whereby, due to the generation of a multi-particle state in the output channel of the beam splitter, and thus due to a plurality of particles striking on the detector, there is a significant increase in the probability of a usable counting event for each multi-particle state generated by the source. For if, within a certain time window, n photons strike the detector with a response probability y for single particles, then the n-particle response probability $P_n$ will be:

$$P_n = 1-(1-\gamma)^n \qquad (1)$$

When using quantum pairs, the response probability of the individual detector is improved from $\gamma$ to $(1-(1-\gamma)^2)$. Thus, for n=2 and $\gamma=0.7$, the detector will already respond in over 90% of cases. If particle sources are available for number states having more than two quanta, the response probabilities can be further improved according to equation (1).

Moreover, using a multi-particle source and a beam splitter, the invention, which is described in greater detail in the following, achieves a counting probability of one, i.e., each particle pair from the source passes to only one detector; no particle pair is split at the beam splitter.

The starting point of the present invention is the generation of a random number on the basis of the quantum statistics of individual particles at a beam splitter. According to the present invention, first of all, a multi-particle state with at least two quantum-mechanically correlated particles is generated, the individual particles being emitted in at least partially different spatial directions, and therefore traversing different beam-component paths.

The particles are preferably photons originating, for example, from an optical cascade transition or from parametric fluorescence. It is also advantageous to employ a particle source which is a photon-pair source, in particular a non-linear optical crystal in conjunction with a pumping light source, such as a laser. Through parametric conversion, one pumped photon will, with certain probability, result in the generation of two fluorescent photons in a quantum-mechanically entangled state with correlated energy, polarization and defined spatial emission distribution. Parametric fluorescence is particularly suitable for the present invention, since in this case, the photons of a photon pair can be easily coupled into the beam-component paths because of the spatial emission distribution. Likewise, existing background radiation, in particular the pumping light, can be suppressed to a great extent by spatial shutters or masks, spectral filters and polarizers.

It is also advantageously possible to use a squeezed-light source as the particle source. The photons generated by it are likewise correlated with each other in pairs.

Instead of photons, it is also possible to employ atoms or other quantum particles. In analogy to light optics, "optical" elements are also known for atoms, such elements having the properties of a beam splitter, polarizer, mirror, detector, etc.

A special quantum-mechanical characteristic of the particles which are in a quantum—mechanically entangled state is their ability, like wave amplitudes, to interfere with each other as particles. Although the overall intensities are always positive, there are arrangements in which the intensities of two photons or other quanta are added to form zero, i.e., interfere each other away. Because of the conservation of energy, such anti-correlations cause the pair-wise occurrence of the photons elsewhere. This characteristic is used according to the present invention to cause a particle pair, in which the two partners are not collinear, at a beam splitter to always leave the beam splitter as a pair in one of the two outputs.

Therefore, after the generation of the multi-particle state, particularly of a photon pair, in contrast to the process disclosed in German Patent Document No. DE 196 41 754.6, one of the particles is not coupled into a trigger channel and detected, but rather both or all particles are coupled into generally different input channels of a beam splitter and brought to interference at the beam splitter. Provided for this purpose are particle-deflecting elements, such as mirrors, prisms, lenses and the like, which are disposed in one or all of the beam-component paths. The respective beam-component paths of the random-number generator are preferably of approximately identical optical length, in order to ensure that the particles are able to interfere with each other at the beam splitter. To precisely match the lengths, it is possible to provide adjusting elements which are electrically controllable. Likewise, one of the beam-component paths is preferably provided with a variable delay section, e.g., with an optical trombone slide.

Also provided is at least one particle-influencing element which is tunable and is positioned in a beam-component path-length. By tuning this element, it is ensured according to the present invention that all the particles at the beam splitter are directed into a common output channel of the beam splitter and therefore strike on the detector allocated to this output channel. The response probability of the detector is increased by the substantially simultaneous impact of at least two particles.

The detectors are adapted to the particles emitted by the particle source. In the case of a random-number generator on an optical basis, the detectors are photodetectors which are matched to the wavelength, e.g., infrared detectors. Single-photon detectors, especially avalanche diodes, are particularly advantageous in this case.

Preferably, the particle-influencing element is tuned in that the coincidences between the outputs of the beam splitter—i.e., between the detectors allocated to the outputs—are measured and minimized. Given approximately identical transit times of the particles in the beam-component paths, the disappearance of coincidences means that the particles leave the beam splitter via a common output. However, it is also possible to calculate what setting of the elements positioned in the beam-component paths will lead to the minimization of the coincidences, and for that setting to be selected accordingly. In the latter case, under certain circumstances, it may only be necessary to readjust the apparatus for the actual minimization of the coincidences.

The particle-influencing element is preferably an interferometer, in particular a Mach-Zehnder interferometer, a Michelson interferometer or a Fabry-Perot interferometer or an echelon. The interferometer may also be a linearly double-refractive crystal, preferably a $\lambda/2$ plate matched to the wavelength of the light passing through the interferometer. To increase the path difference, in the last-mentioned case, the interferometer can include a compensator, in particular a Babinet-Soleil compensator or an electrically tunable delay plate such as a liquid-crystal cell, Kerr cell or the like.

In one advantageous refinement of the invention, the path-length difference of the interferometer exceeds the coherence length of the photons by a multiple. This prevents the particle passing through the interferometer from interfering with itself. In this embodiment of the present invention, the optical path length of the one beam-component path, averaged over the interferometer arms, is substantially identical with the optical path length of the other beam-component path, and the path-length difference in the interferometer is preferably a whole-number multiple of the mean wavelength of the photons emitted by the particle source. In this case, the probability of coincidences between the outputs of the beam splitter is theoretically zero, so that, in practice, a large proportion of all photon pairs leave the beam splitter spatially as a pair, thus increasing the response probability of the respective detector.

Likewise, given correct tuning of the elements, none of the photon pairs is split at the beam splitter. This prevents the photons of a pair from causing both detectors to respond and thereby produce counting events which do not correspond to an unambiguous bit value of 0 or 1. In order to suppress any response of both detectors nevertheless occurring and to discard such response for the generation of a random number, provision is preferably made for an anti-coincidence circuit which only evaluates a counting event of a detector if the other detector has not registered a particle within a defined time window.

In the event that a source of multi-photon number states is available, the individual state is, in turn, split and dropped on the two inputs of the beam splitter. Due to the particle interference, the photons all leave the beam splitter in one output and are detected as in the two-particle case. The more photons leave the beam splitter in one arm and are simultaneously detected, the higher is the counting efficiency of the detectors according to equation (1).

BRIEF DESCRIPTION OF THE DRAWINGS

FIG. 1 shows schematically the generation of a quantum-mechanically correlated photon pair by parametric fluorescence. For this purpose, a non-linear crystal 1 of type I or crystal 1' of type II is pumped with a laser beam of wavelength $\lambda_P$ and high intensity. The crystal is so cut and oriented in relation to the excitation beam that the so-called phase-matching conditions are met. In the crystal, a pumped photon will split, with a certain probability, into two fluorescent photons of wavelengths $\lambda_1$ and $\lambda_2$, it being the case that, because of the conservation of energy, $\lambda_P=\lambda_1+\lambda_2$. Both $\lambda_1$ (and therefore $\lambda_2$) as well as the polarization of the two fluorescent photons $P_1$, $P_2$ are defined by the geometry of the arrangement and of the crystal. In the case of non-linear crystals of type I, FIG. 1a, a pumped photon splits into two fluorescent photons of parallel linear polarization $P_1$ and $P_2$, respectively, which are emitted in spatial directions as a function of the excitation geometry, i.e., in particular, the orientation of the pumping beam in relation to the optical axes of the crystal. In the case of non-linear crystals of type II, FIG. 1b, two photons polarized orthogonally with respect to each other are generated accordingly. For certain geometries, the two photons are determined in the same direction (collinearly).

FIG. 2 shows schematically a random-number generator according to the invention. The random-number generator has a particle source 3 for quantum-optically correlated photon pairs. This light source is a suitably cut and oriented optically non-linear crystal 2 which is pumped by a laser beam of high intensity and suitable frequency. Parametric conversion of the pump photons results in two fluorescence beams which leave crystal 2 in different directions relative to the propagation direction of the pumping beam. In each case, one photon of the one beam is in a quantum-mechanically entangled state with another photon of the other beam.

Figure 1A:
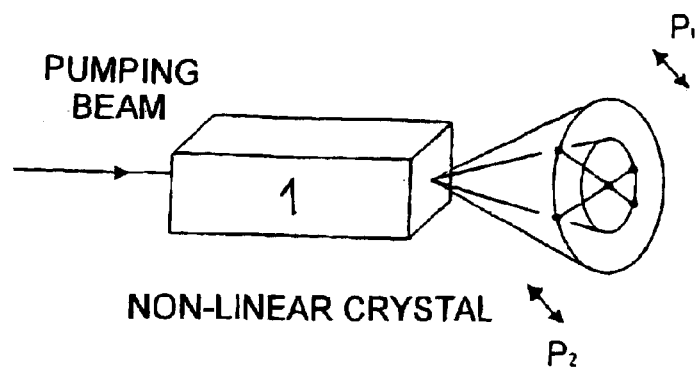
FIGS. 1a, 1b show the generation of a photon pair by parametric fluorescence at a non-linear crystal of type I or II.
Figure 1B:
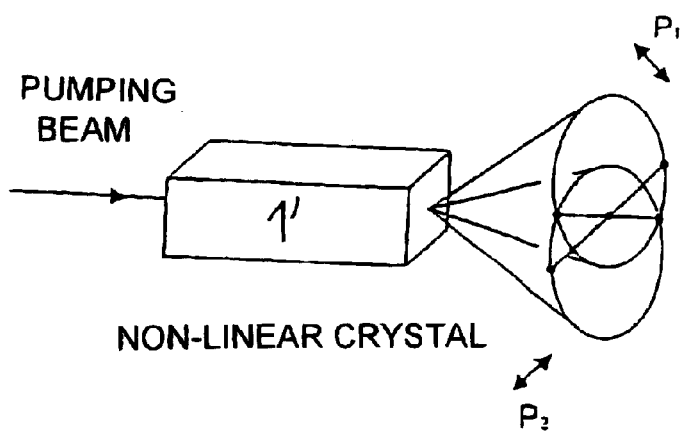

The fluorescent photons leaving photon source 3 are coupled as beam components into the two beam-component paths 5, 6 of the random-number generator. The pumping light is kept away from the further optical path by spectral filters or by shutters or masks (not shown here). Beam-component paths 5, 6 are brought together at a beam splitter 8 by a particle-deflecting element, in this case a lens 4. The beam splitter preferably has a splitting ratio of 1:1 in order to achieve identical probabilities for the selection of outputs 11, 12 of the beam splitter, and thus for the bit values 1 and 0. Disposed at the output or at the input of the beam splitter there may be a λ/2 delay plate, rotatable by computer control, or an electro-optical delay element with which it is possible to correct tolerance-contingent deviations in the splitting ratio.

A particle-influencing element 9 is disposed in beam-component path 5. In the case shown, particle-influencing element 9 is a λ/2 plate or other polarization adjusting element PS which, in the case of type II geometry, is used to identically polarize the two partners of the photon pair.

Disposed in the other beam-component path 6 is a variable delay section 10, in this case an optical trombone slide PZ. This makes it possible to insert a variable time difference in the transit time between the two beams. The two beams 5, 6 fall on beam splitter 8 and subsequently on the two detectors $D_1$ and $D_2$ of the random-number generator. One detector $D_1$ and $D2$, respectively, is unambiguously allocated to each output 11, 12 of the beam splitter. Detector $D_1$ stands for the bit value 0 and detector $D_2$ stands for the bit value 1 of the random sequence.

If the possibilities of the photons—of either both being reflected or both being transmitted at the beam splitter—are indistinguishable, then the two photons interfere in such a manner that they always leave the beam splitter as a pair in the same output 11 or 12, and either both strike detector $D_1$ or both strike detector $D_2$. This simply requires trombone slide 10 to be suitably tuned, which can easily be achieved in a coincidence circuit of detectors $D_1$ and $D_2$. If there is tuning, the coincidences disappear.

As in the case of the customary optical random-number generator, the "0" is allocated to detector $D_1$ and the "1" is allocated to $D_2$. According to the present invention, two photons always strike a detector, and the efficiency is improved according to equation (1). Furthermore, there are no cases in which the photons of the photon pair are split, causing both $D_1$ and $D_2$ to respond. This increases the counting probability and the speed with which the random sequence is built, because each of the photon pairs generated is theoretically able to define one bit of the random sequence. In order to suppress the possibly still occurring simultaneous responding of $D_1$ and $D_2$ with regard to the generation of a bit, detectors $D_1$ and $D_2$ are preferably connected in an anti-coincidence manner.

Figure 2:
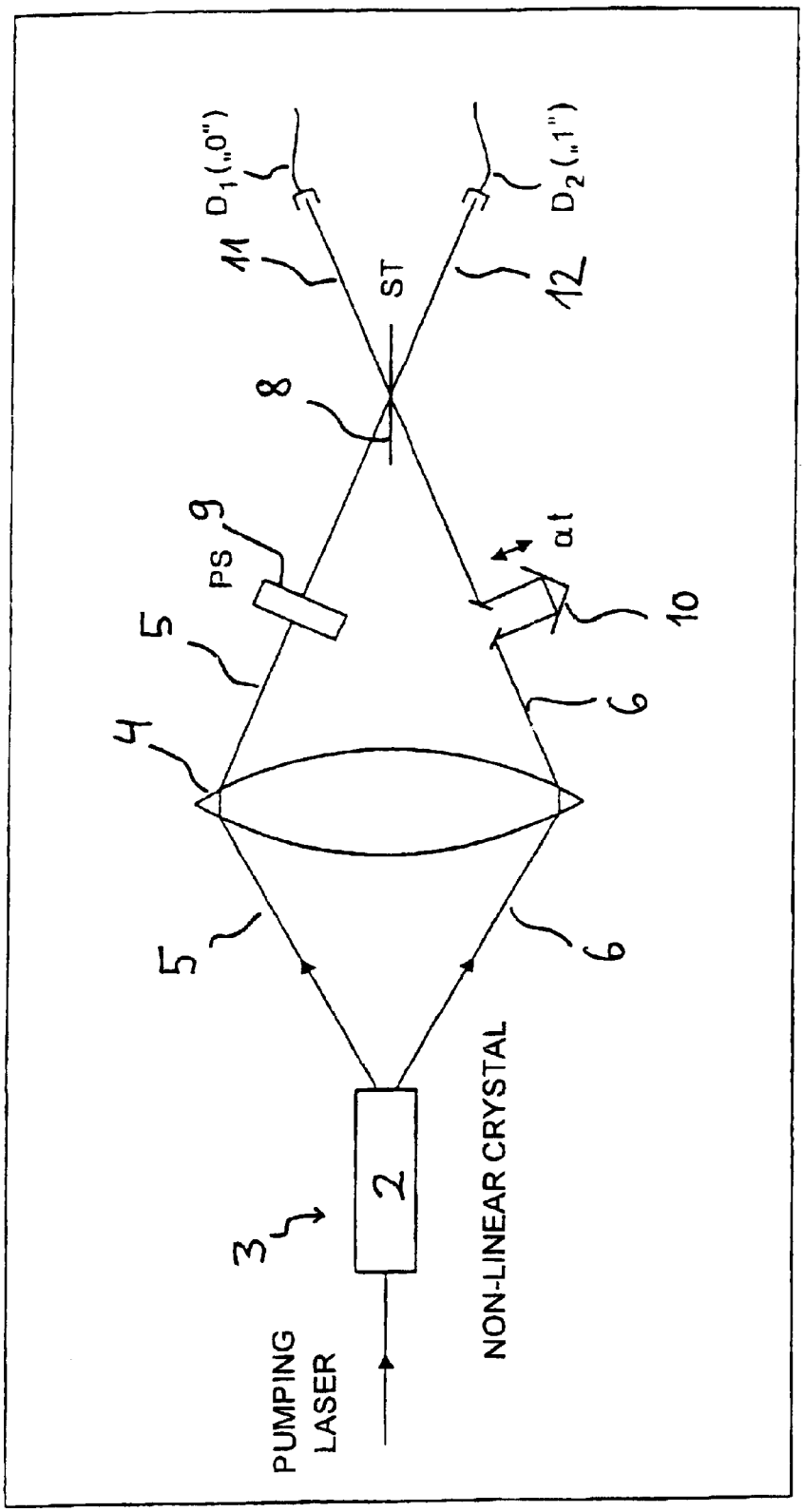
FIG. 2 shows schematically a random-number generator according to one embodiment of the present invention.
Figure 3:
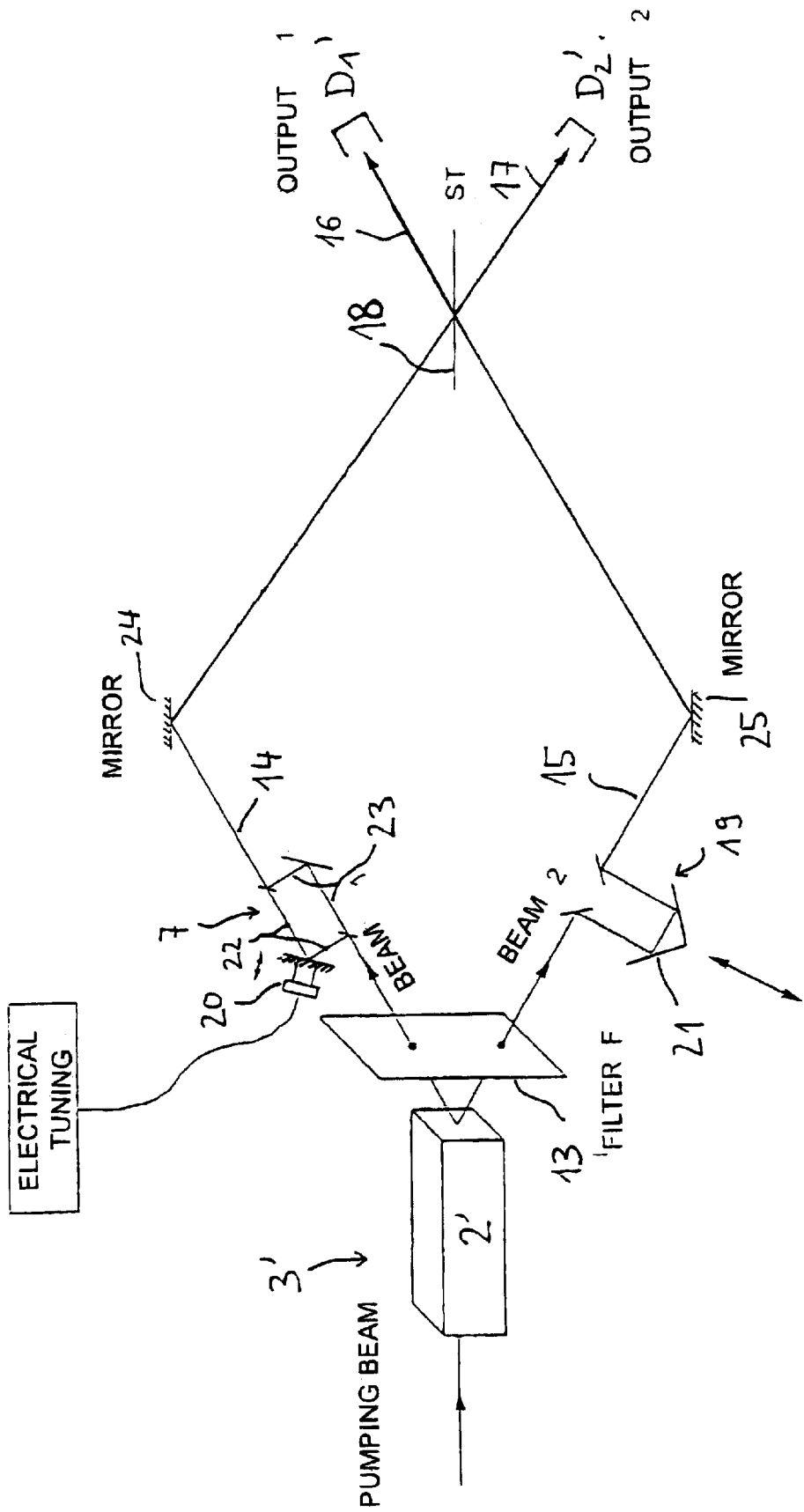
FIG. 3 shows a random-number generator according to another embodiment of the present invention.

FIG. 3 shows another embodiment of an optical random-number generator according to the present invention. Particle source 3' for quantum-optically correlated photon pairs is designed as in FIG. 2 and includes an optically non-linear crystal 2' which is pumped by a laser. The pumping light is suppressed by a filter 13. This filter is preferably an optical bandpass filter which is impermeable for the pumping wavelength, but which transmits the fluorescent light of the fluorescence wavelengths $\lambda_1$ and $\lambda_2$, respectively. Disposed at the output of light source 3' may also be a filter which reduces the intensity of the fluorescent light to such an extent that, with a certain probability, only one photon pair will be in the arrangement at a time.

The quantum-mechanically correlated fluorescent photons are each coupled into a beam-component path 14 and 15, respectively, of the random-number generator. By deflection via one or more mirrors 24, 25, beam-component paths 14, 15 are brought back together at a beam splitter 18. Both beam-component paths 14, 15 are superimposed by beam splitter 18 and redirected into two separate output channels 16, 17.

In this embodiment of the present invention, disposed in one of the beam-component paths 14 is an interferometer 7 which, in this case, is a Mach-Zehnder interferometer having interferometer arms 22 and 23. Interferometer arm 22 is of optical length $\delta l_F$, which can be adjusted by an electrically controllable adjusting element 20. Interferometer arm 23 is of fixed length $\delta l_S$.

Disposed in the other beam-component path 15 is an optical delay section 19 which, in this case, is an optical trombone slide. Optical length $\delta l$ of delay section 19 is variable by a further adjusting element 21. Like adjusting element 20, this adjusting element 21 is preferably electrically controllable, this making it possible to vary length 61 of delay section 19 by remote control, e.g., by computer control.

The optical lengths of beam-component paths 14, 15, without consideration of the lengths of interferometer arms 22, 23 or of optical delay section 19, are preferably the same. In the case of a photon pair of identical polarization generated with a non-linear crystal of type I, it is then possible to state the coincidence rate K for coincidences between outputs 16, 17 as follows:

$$K = \frac{1}{2}\left\{1 - \frac{1}{2}\exp\left[-\frac{1}{c^2 a^2}(\delta l_F - \delta l)^2\right] - \frac{1}{2}\exp\left[-\frac{1}{c^2 a^2}(\delta l_S - \delta l)^2\right] + \right.$$
$$\cos\left[\frac{\omega_0}{c}(\delta l_F - \delta l_S)\right] \cdot \left[\exp\left[-\frac{1}{4c^2 a^2}(\delta l_F - \delta l_S)^2\right] - \right.$$
$$\left.\left.\exp\left[-\frac{1}{c^2 a^2}\left(\frac{\delta l_F + \delta l_S}{2} - \delta l\right)^2\right]\right]\right\}$$
(2)

where $\delta l_F$, $\delta l_S$, $\delta l$, respectively, are the optical paths in interferometer arms 22, 23 and in delay section 19, c is the speed of light and a determines the spectral width of the spectrum of the two beams. A Gaussian distribution $\exp[-a^2(\omega-\omega_0)^2]$ with the mean frequency $\omega_0$ and $\omega_1 + \omega_2 = 2\omega_0$ was assumed for both beams.

In the following, it is assumed that the spectral width of the two photons $1/a$ is so great that the path difference $\delta l_F - \delta l_S$ of the interferometer exceeds the coherence length $c \cdot a$ of the photons by a multiple. Furthermore, it is assumed that optical path lengths $\delta l_F$, $\delta l_S$ and $\delta l$ are matched to each other in such a manner, that there applies $\delta l = \frac{1}{2}(\delta l_F + \delta l_S)$. This, of course, is identical to the case in which the entire optical length of beam-component path 15 including optical delay section 19 conforms with the mean optical length of beam-component path 14 including the length of interferometer arms 22, 23.

Therefore, the random-number generator is preferably tuned such that the path difference $\delta l_F - \delta l_S$ of interferometer 7 exceeds the coherence length $c \cdot a$ of the photons by a multiple, and the optical path length of the one beam-component path 14, averaged over interferometer arms 22, 23, essentially conforms with the optical path length of the other beam-component path 15, including delay section 19.

If the interferometer is implemented by a linearly double-refractive crystal, it preferably includes a compensator for expanding the path difference, in particular a Babinet-Soleil compensator or an electrically tunable delay plate such as a liquid-crystal cell, Kerr cell or the like.

For this case $\delta 1 = \frac{1}{2}(\delta 1_F + \delta 1_S)$ and $c \cdot a << |\delta 1_F - \delta 1_S|$ the coincidence rate K changes to $$K \approx \frac{1}{2}\left\{1 - \cos\left[\frac{\omega_0}{c}(\delta l_F - \delta l_S)\right]\right\} \quad (3)$$

If $\cos\left[\frac{\omega_0}{c}(\delta l_F - \delta l_S)\right] = +1$, i.e., $\delta l_F - \delta l_S = n2\pi\frac{c}{\omega_0} = n\lambda_0$ where n=0, 1, ..., then K=0 applies. This means that both photons leave the beam splitter together as a pair in one of outputs 16, 17, and together cause detector $D_1'$ or $D_2'$ disposed there to respond. In this context, however, it is completely uncertain which of the outputs they will take. This elementary process is utilized according to the invention to generate the random sequence, in that the optical elements introduced into the beam-component paths are set according to the above equation, so that K=0 then applies.

Once again in this case, detectors $D_1'$ and $D_2'$ are preferably interconnected via a coincidence/anti-coincidence circuit which is part of the evaluation electronics, the coincidence circuit being used to tune the random-number generator and the anti-coincidence circuit being used to suppress erroneous events (responding of both detectors).

The output signals from detectors $D_1'$ and $D_2'$ are supplied to evaluation electronics (not shown here) which may also be part of a data-processing system.

The present invention is industrially applicable in all areas in which reliable random numbers need to be generated, particularly in the field of telecommunications in order to improve methods of cryptography.

List of reference characters:

| | |
|---|---|
| 1, 1', 2, 2' | Non-linear crystal |
| 3, 3' | Light source |
| 4 | Lens |
| 5, 6, 14, 15 | Beam-component path |
| 7, 9 | Particle-influencing element: interferometer or polarization adjusting element |
| 8, 18 | Beam splitter |
| 10, 19 | Optical delay section (optical trombone slide) |
| 11, 12, 16, 17 | Output channel (beam splitter) |
| 13 | Filter |
| 20, 21 | Adjusting element |
| 22, 23 | Interferometer arm |
| 24, 25 | Mirror |
| $D_1, D_1', D_2, D_2'$ | Detector |

What is claimed is:

1. A method for quantum-mechanically generating a random number using a random process of path selection at a beam splitter, the method comprising:

generating a multi-particle state having at least two quantum-mechanically correlated particles, the at least two particles being emitted in at least partially different spatial directions so as to traverse respective different beam-component paths;

coupling the at least two particles into respective input channels of the beam splitter so as to bring the at least two particles into interference at the beam splitter; and directing the at least two particles into a same output channel of the beam splitter by tuning at least one particle-influencing element disposed in at least one path of the beam component paths so that the at least two particles substantially simultaneously encounter a detector allocated to the same output channel so as to increase a response probability of the detector, a counting event at the detector being assigned a predetermined numerical value.

2. The method as recited in claim 1 wherein the random number is a random sequence and further comprising using a detection of the at least two particles in the same output channel to build the random sequence.

3. The method as recited in claim 1 wherein the method is an optical method.

4. The method as recited in claim 3 wherein the at least two particles are photons, the beam splitter is an optical beam splitter and the detector is a photodetector.

5. The method as recited in claim 1 wherein the generating is performed using parametric fluorescence.

6. The method as recited in claim 1 wherein the beam splitter includes a first and a second output channel, the same output channel being the first or the second output channel, and wherein the tuning of the at least one particle-influencing element is performed by measuring and minimizing coincidences between the first output channel and the second output channel.

7. A random-number generator comprising:

a multi-particle source capable of substantially simultaneously emitting at least two particles in a quantum-mechanically correlated state;

a beam splitter including a first and a second input and a first and a second output, the beam splitter being disposed in relation to the particle source so that the at least two particles encounter the beam splitter;

at least one particle-deflecting element for guiding each of the at least two particles to a respective one of the first and second inputs;

at least a first and a second detector capable of detecting the at least two particles, the first detector being allocated to the first output, the second detector being allocated to the second output, a counting event at one of the first and second detectors being assigned a respective predetermined numerical value; and at least one particle-influencing element disposed between the particle source and the beam splitter in an optical path of at least one of the at least two particles, the particle-influencing element being tuned so that the at least two particles are directed at the beam splitter into a same output of the first and second outputs and encounter a respective one of the first and second detectors.

8. The random-number generator as recited in claim 7 wherein the random number is a random sequence and further comprising using a detection of the at least two particles in the same output to build the random sequence.

9. The random-number generator as recited in claim 7 wherein the multi-particle source includes a two-photon source, the two-photon source including an optically non-linear crystal pumped by a pumping light source.

10. The random-number generator as recited in claim 9 wherein the pumping light source includes a laser.

11. The random-number generator as recited in claim 7 wherein the multi-particle source includes a squeezed-light source.

12. The random-number generator as recited in claim 7 wherein the particle-influencing element includes an interferometer.

13. The random-number generator as recited in claim 12 wherein the interferometer includes at least one of a Mach-Zehnder interferometer, a Michelson interferometer, a Fabry-Perot interferometer and an echelon.

14. The random-number generator as recited in claim 12 wherein the interferometer includes a linearly double-refractive crystal.

15. The random-number generator as recited in claim 14 wherein the linearly double-refractive crystal includes a $\lambda/2$ plate matched to a wavelength of light passing through the interferometer.

16. The random-number generator as recited in claim 12 wherein the interferometer includes a compensator.

17. The random-number generator as recited in claim 16 wherein in the compensator includes at least one of a Babinet-Soleil compensator and an electrically tunable delay plate.

18. The random-number generator as recited in claim 17 wherein the delay plate includes at least one of a liquid-crystal cell and a Kerr cell.

19. The random-number generator as recited in claim 12 further comprising a first and a second beam component path, the first beam component path including the optical path, and wherein the at least two particles are photons and wherein a path-length difference of the interferometer exceeds a coherence length of the photons by a multiple, an optical path length of the first beam-component path averaged over arms of the interferometer substantially conforming with an optical path length of the second beam-component path.

20. The random-number generator as recited in claim 19 wherein and the path-length difference is a whole-number multiple of a mean wavelength of the photons.

21. The random-number generator as recited in claim 12 further comprising a first and a second beam component path, the first beam component path including the optical path, and wherein the second beam-component path includes a variable optical delay section.

22. The random-number generator as recited in claim 21 wherein the variable optical delay section is tunable using an electrically controllable adjusting element.

23. The random-number generator as recited in claim 21 wherein the variable optical delay section includes an optical trombone slide.

24. The random-number generator as recited in claim 7 wherein the at least first and second detectors each include a respective single-photon detector.

25. The random-number generator as recited in claim 24 wherein each single-photon detector includes at least one avalanche diode.

* * * * *